United States Patent
Dong et al.

(10) Patent No.: US 6,757,706 B1
(45) Date of Patent: Jun. 29, 2004

(54) METHOD AND APPARATUS FOR PROVIDING RESPONSES FOR REQUESTS OF OFF-LINE CLIENTS

(75) Inventors: Liu Dong, Beijing (CN); Leo Y. Liu, Cary, NC (US); XiaoYan Chen, Beijing (CN); XiaoPei Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/492,000

(22) Filed: Jan. 26, 2000

(30) Foreign Application Priority Data

Jan. 28, 1999 (CN) .......................... 99101605 A

(51) Int. Cl.[7] .............................................. G06F 15/16
(52) U.S. Cl. ...................... 709/203; 709/202; 709/224
(58) Field of Search ................................ 709/202, 203, 709/224, 248

(56) References Cited

U.S. PATENT DOCUMENTS

| | | | | |
|---|---|---|---|---|
| 5,809,242 A | * | 9/1998 | Shaw et al. ................. | 709/217 |
| 5,832,218 A | * | 11/1998 | Gibbs et al. ................ | 709/203 |
| 5,867,651 A | * | 2/1999 | Dan et al. ................... | 709/203 |
| 5,873,100 A | * | 2/1999 | Adams et al. .............. | 707/204 |
| 5,893,116 A | * | 4/1999 | Simmonds et al. ......... | 707/201 |
| 5,894,554 A | * | 4/1999 | Lowery et al. ............. | 709/203 |
| 6,026,474 A | * | 2/2000 | Carter et al. ............... | 711/202 |
| 6,070,184 A | * | 5/2000 | Blount et al. ............... | 709/200 |
| 6,161,185 A | * | 12/2000 | Guthrie et al. ............. | 713/201 |
| 6,345,308 B1 | * | 2/2002 | Abe ........................... | 709/248 |

FOREIGN PATENT DOCUMENTS

| | | |
|---|---|---|
| JP | 11249948 | 9/1999 |
| JP | 1136151 | 11/1999 |

OTHER PUBLICATIONS

"Turbocharge your Browser" PC Computing, v11, n7, p. 152, Jul. 1998.
"Push":Promise of Peril PC Computing, v10, n9, p. 318, Sep. 1997.
"Microsoft Offers a change to avoid PC upgrades with new client software" Computergram International, N3186, Jun. 19, 1997.
Microsoft Internat Explorer Version 4.0, Helo files 1997.

* cited by examiner

Primary Examiner—Ario Etienne
Assistant Examiner—LaShonda Jacobs
(74) Attorney, Agent, or Firm—Rafael Perez-Pineiro; Anne Vachon Dougherty

(57) ABSTRACT

An apparatus for providing responses to requests of an off-line client, comprising: a local request-response storage which stores a plurality of requests and a plurality of responses; a network traffic redirector, for redirecting requests of the client to the client machine itself by modifying the system configuration of the client machine when the client is off-line, and for redirecting requests of the client to the network connection by resuming the system configuration of the client machine when the client leaves the off-line state and enters an on-line state; and a local off-line server, for receiving a request of the client redirected to the client machine itself, for generating a response based on the request, the plurality of requests and the plurality of responses stored in the request-response storage, and for returning the response to the client.

18 Claims, 9 Drawing Sheets

METHOD AND APPARATUS FOR PROVIDING RESPONSES FOR REQUESTS OF OFF-LINE CLIENTS

FIELD OF THE INVENTION

The present invention relates to a method and apparatus for providing responses to requests of a client, and particularly to a method and apparatus for providing responses to requests of a client that is in an off-line state.

BACKGROUND OF THE INVENTION

The nineties of the 20th century featured a tremendous social technology revolution which by the collaboration of the data processing industry with the consumer electronics industry. Like all other revolutions, it has had a prominent effect on the technology development trend, especially accelerating the development of those technologies which have been in a fledgling state. One main field among these technologies is the transmission of Internet relevant documents, media and applications. The combination of the consumer electronics industry with the data processing industry has greatly prompted demands on versatile communication transmission methods. From being a loose-coupled computer network used for transmitting science and government data, the Internet has entered a strikingly developing era after over ten years of silent existence. With such development, business and consumers can access all the documents, media and programs directly.

The Internet is an open and worldwide computer network which includes lots of connected subnets. It has been developed from the previous American ARPAnet. Now, it mainly uses TCP/IP as the communication protocol. TCP/IP is an acronym for "Transfer Control Protocol/Internet Protocol", which is a software protocol developed by the U.S. Department of Defense for computer communication. The Internet can be described as a geographically distributed remote computer network system which executes such networking protocols to allow users to share information and interact. Because of this-kind of widely used information sharing, remote networks such as the Internet have been fully developing into the "open" systems. Therefore, users can design their software applications without constraints to perform specific operations or services. The detailed information about the Internet nodes, objects and links can be referred to in the textbook "Mastering the Internet", authored by G. H. Cady etc., and published by Sybex Corporation in Alameda, Calif. in 1996.

The World Wide Web (WWW) is the Internet multimedia information indexing and retrieving system. WWW clients use Hypertext transfer protocol—HTTP to achieve transaction processing with the Web Server. HTTP is a well known communication protocol. It allows users to use Hypertext Markup Language—HTML, which is a standard web page description language, to access all kinds of files, such as text, graphics, image, audio and video, etc. HTML provides a basic file format, and allows developers to specify links with other servers and files.

The client/server structure is very popular in WWW. In most cases, the Web client uses a browser to send requests to the web server, and to explain and display (or play) the hypertext information and all kinds of multimedia data formats returned from the Web server.

In real client/server network applications, it is not possible for the client-end software to keep online all the time, especially for those executed on mobile devices. Currently, the widely used mobile devices include the notebook PC such as IBM ThinkPad, handheld PC such as 3COM PalmPilot and IBM WorkPad, or many other handheld devices embedded with network connection. Because of the mobility of such devices, it is inconvenient for them to connect to the net in most situations.

When network connection is impossible, it is absolutely necessary for the client side software to keep working off-line, thus not only the handy features of mobile devices but the huge advantages of the Internet could be fully utilized as well.

Currently, the client side software is unable to work normally when off-line unless it has been specifically so designed. Actually, there have been many specific methods to address this problem. But these methods are either for a specific application or for specific hardware. A common and simple method is greatly needed to keep client side software working normally even when it is off-line.

The important difference between on-line and off-line states is that during the on-line state the client can get the response from the server if necessary. But in the latter case, the client is unable to communicate with the server. So, in client/server architecture, client side software is usually unable to keep on working normally during off-line state.

The first objective of this invention is to provide an apparatus for providing responses to requests of an off-line client.

The second objective is to provide a method for providing responses to requests of an off-line client.

The third objective is to provide a computer-readable media for recording programs which respond to the requests of an off-line client.

SUMMARY OF THE INVENTION

To achieve the objectives mentioned above, this invention provides an apparatus for providing responses for requests of an off-line client, characterized by comprising:

- a request-response storage (703), provided in a client machine, which stores a plurality of requests and a plurality of responses;
- a network flow redirector (701), for redirecting requests of the client from a network connection to the client machine itself by modifying system configuration of the client machine when said client is in an off-line state, and for redirecting requests of the client from the client machine itself to the network connection by resuming the system configuration of the client machine when said client leaves the off-line state and enters an on-line state; and
- an off-line server (702), provided in the client machine, for receiving the requests of the client redirected by said network flow redirector (701) to the client machine itself, generating responses based on requests received, said plurality of requests and said plurality of responses stored in said request-response storage (703), and returning generated responses to said client as responses of a server.

To achieve the second objective mentioned above, this invention provides a method for providing responses for requests of an off-line client, characterized by comprising steps of:

(a) providing a request-response storage in a client machine, which stores a plurality of requests and a plurality of responses;

(b) redirecting requests of the client from a network connection to the client machine itself by modifying system configuration of the client machine when said client enters an off-line state; and (c) while said client is in the off-line state, repeatedly performing in the client machine steps of:
(c1) receiving a request redirected to the client machine itself,
(c2) generating a response based on said request, said plurality of requests and said plurality of responses stored in said request-response storage, and
(c3) returning said response to said client as a response of a server.

To achieve the third objective mentioned above, this invention provides a computer-readable media for recording programs, on which a program is recorded for performing steps of:

when it is determined that a client enters an off-line state, modifying system configuration of the client machine, such that requests of the client are redirected from a network connection to the client machine itself; and while said client is in the off-line state, repeatedly performing following steps in the client machine:
(c1) receiving a request redirected to the client machine itself,
(c2) generating a response based on said request, said plurality of requests and said plurality of responses stored in a request-response storage provided in the client machine, and
(c3) returning said response to said client as a response of a server.

According to the method and device provided in this invention, to allow the client to keep working normally while off-line, there is no need to modify the client software itself, just make some modification in the client machine's system configuration. Thus, the mobility of the client machine is enhanced greatly. The off-line state is no longer an obstacle to the server and the client. Especially for the client-end software of Personal Digital Assistant (PDA) which is very complex, the mobility of the PDA device could be enhanced greatly because of the removal of the need to modify the client software. Furthermore, the user interface remains unchanged when both on-line and off-line, so there is no need to give additional training to the users.

BRIEF DESCRIPTION OF THE DRAWINGS

These and other features and advantages of this invention will become apparent from detailed description of the preferred embodiments in conjunction with attached drawings, in which.

DETAILED DESCRIPTION OF THE INVENTION

Several specific details will be offered in the following description. It is obviously not necessary for persons skilled in that art to implement this invention using these details. It other cases, the well-known components or circuits are presented merely in the form of a framework to avoid unnecessary details. In most cases, the details like timing sequence, are omitted if such details are not necessary to fully understand this invention and are common knowledge to persons skilled in the art.

Figure 1:
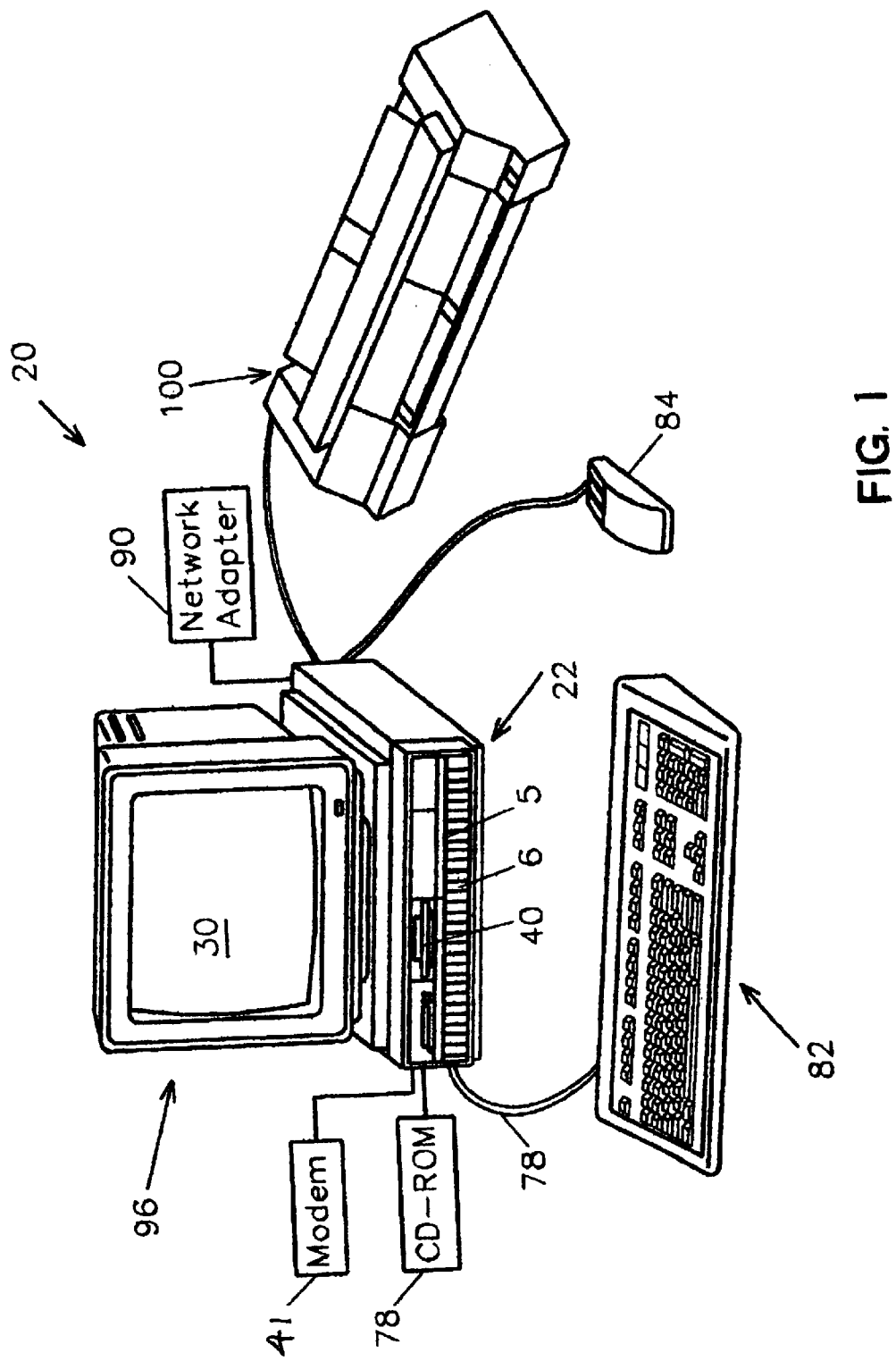
FIG. 1 shows a data processing system which implements this invention.

Now refer to FIG. 1, it shows a data processing system 20 which implements this invention. This system includes processor 22, keyboard 82 and display 96. Keyboard 82 is connected to processor 22 by cable. Display 96 includes display screen 30, which can be implemented by CRT, LCD or electroluminescent display, etc. The data processing system also includes a pointing device 84, which can be implemented by tracing ball, joystick, touching board, touching screen or the mouse shown in the figure. This pointing device 84 can be used to move the arrow or cursor on the display screen 30. Processor 22 can be connected to one or more peripheral devices, such as modem 41, CD-ROM 78, network adapter 90 and floppy drive 40. Each peripheral device can be embedded inside or outside processor 22. The output devices such as printer 100 could be connected to processor 22.

It should be acknowledged by persons skilled in the art that display 96, keyboard 82 and pointing device 84 can all be implemented by several currently well-known components.

Figure 2:
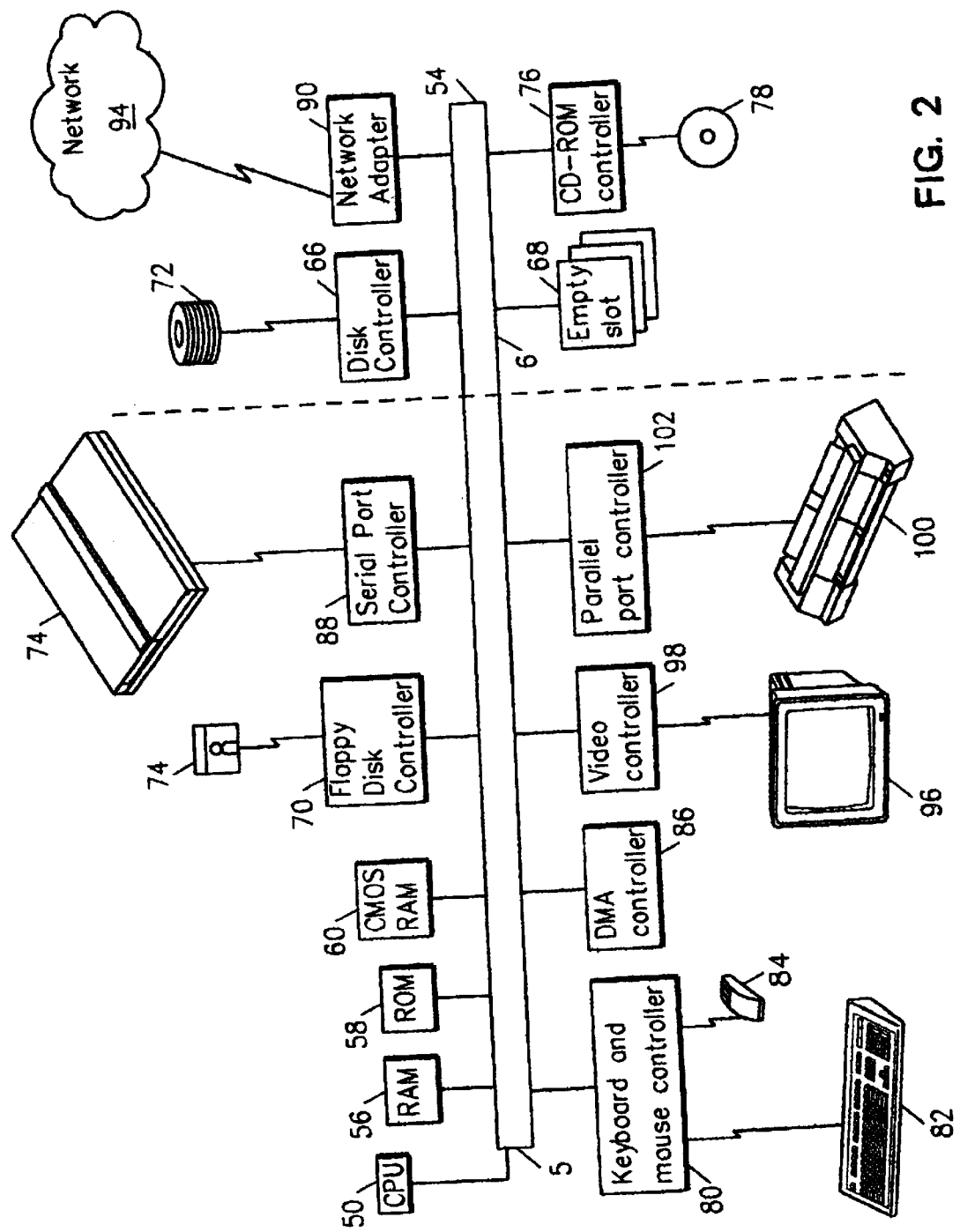
FIG. 2 shows the high level framework of the components of the data processing system shown in FIG. 1.

Now referring to FIG. 2, the high level framework of the components of the data processing system shown in FIG. 1 are depicted. The data processing system 20 is mainly controlled by the instructions which are readable to the computer. These instructions could be in the form of software, regardless of where or how to store or access the software. The software can be executed on CPU 50 to make the data processing system 20 work.

The storage devices connected to the system bus 5 include RAM 56, ROM 58, nonvolatile memory 60 and the circuit used to store and access information. ROM is used to store data that couldn't be modified. On the contrary, data stored in RAM can be modified by CPU 50 or other hardware devices using DMA controller 86. Nonvolatile memory 60 has the ability to still keep data even when power is down. Nonvolatile memory includes ROM, EPROM, flash memory and battery backup CMOS RAM. As shown in FIG. 2, this kind of battery backup CMOS RAM could be used to store system configuration information.

The extension card or board is a circuit board containing chips and other electronic components. These components are connected to offer additional functions or resources for the computer. In general, the extension card 54 with bus 6 could be used to contain storage, disk controller 66, video card, parallel and serial port, and embedded modem. For those lap computers, handheld computers or other portable computers, extension card is usually implemented as PC card, as the similar size as the credit card and inserted into the slot beside or in the back of the computer. One example of this kind of slot is PCMCIA(personal computer memory card international association) slot, defining No. 1, 2, 3 card slot. Empty slot 68 could be used to contain all kinds of extension card or PCMCIA card.

Both disk controller 66 and floppy controller 70 include specific integrated circuits and other related circuits. It is their responsibility to instruct and control reading and writing data from/to the hard disk drive 72 and floppy drive 74 respectively. The operations handled by this kind of disk controllers include locating read/write head, arbitrating between the driver and the CPU 50, and controlling the transmission from/to the storage. A single disk controller can control more than one disk drive. CD-ROM controller 76 could be included in the data processing system 20, and can read data from CD-ROM 78. This kind of CD-ROM uses laser components instead of magnetic equipment to read data.

Keyboard-mouse controller 80 is used as an interface between keyboard 82 and pointing device 84 in data processing system 20. The pointing device is generally used to control an on-screen component. For example, an arrow-like cursor has a hot point which can specify the location of the pointing device when a user clicks on the mouse or presses a key on the keyboard. There are many other pointing devices, such as graphics input board, stylus, light pen, joystick, tracking ball, track board, and the devices with IBM's "TrackPoint" brand.

Communication between the data processing system 20 and other data processing systems can be simplified by the serial port controller 88, which is connected to system bus 5, and network adapter 90. The serial port controller 88 is used to transmit information between computers (22 and 122 of FIG. 2), or between the computer and peripheral devices, one bit each time in a single line. Serial communication could be either synchronous (controlled by some standards such as clock) or asynchronous (managed by exchanging signals controlling information flow). Interface RS-232 and RS-422 are two examples of serial communication standard. As shown in the figure, this kind of serial interface could be used to communicate with modem 41 of FIG. 1. Modem is a communication device which enables computer to transmit information in the standard telephone line. Modem 41 converts the digital signal of computer to internal clock signal which is suitable for transmitting in telephone line. It can be used to connect the data processing system 20 with an online information service organization such as "PRODIGY" provided by IBM and Sears. This kind of online service provider can offer many software which can be downloaded to the data processing system 20 via modem 41. Modem 41 can provide connection to several software resources such as server, electronic bulletin board, the Internet and WWW.

The network adapter 90 could be used to connect the data processing system 20 to LAN 94. LAN 94 can provide the device allowing users to mail and transmit software and information electronically. Besides this, it can also offer distributed processing, using several computers to share the workloads or cooperate while executing one task.

The display 96 controlled by display controller 98 is used to display the video output generated by the data processing system 20. This kind of video output includes text, graphics, motion picture and movie. The display 96 can be implemented by CRT based video display, LCD based plane display or gas plasma based plane display. The display controller 98 is an electronic component which can be used to generate the video signal transmitted to the display 96.

The printer 100 could be connected to the data processing system 20 via parallel port controller 102. It is used to place the text or image produced by the computer to paper or another media such as transparent film. There are several other types of printers such as image setter, graph plotter, or slide recorder, etc. The parallel port controller 102 could be used to transmit multiple data bits and control bits in the line between system bus 5 and another parallel communication device such as printer 100.

CPU 50 is charge of reading, decoding and executing instructions, and transmitting information from/to other resources via system bus 5, which is the computer's main data transmitting route. This kind of bus connects all components in the data processing system 20, also specifying the media which is used to exchange data. As shown in FIG. 2, system bus 5 connects storage 56, 58, 60, CPU 50 and other devices, and enables data exchange among them. Additional bus 6 connects the CDRom 76 and other components on the extension card 54.

Figure 3:
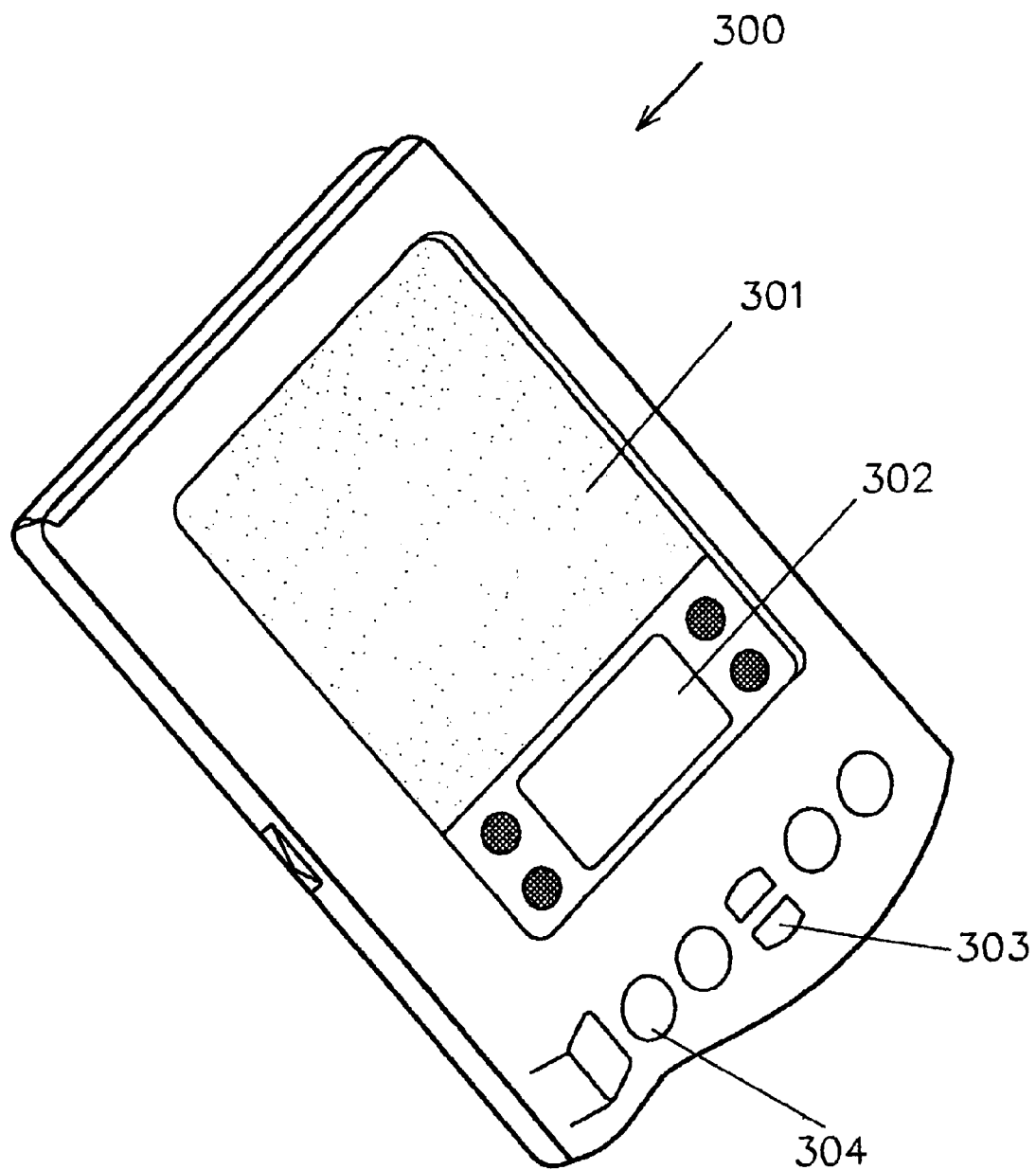
FIG. 3 shows a handheld data processing system which implements this invention.

Now referring to FIG. 3, a handheld data processing system 300 which implements this invention is shown. The front board of the system includes display screen 301, hand writing area 302, scrolling buttons 303, and application buttons 304. Display screen 301 is used to display the information stored in the handheld data processing system 300. It is touch sensitive, which means it can induce when a user point-clicks the screen by a pen. It can also display the control and configuration information when an application is executing. Hand writing area 302 is used by user to write text by the pen. Scrolling buttons 303 are used to help view the text or other information beyond the display screen 301, including up scrolling and down scrolling button. Application buttons 304 are used to activate applications, each with a special icon. The handheld data processing system 300 could be WorkPad from IBM, or PalmPilot from 3COM. As for IBM's WorkPad, there are four application buttons in its front board, corresponding to the notepad, address book, task list and memo applications, respectively. In addition, an appropriate pen (not shown in the figure) could be provided together with the handheld data processing system 300 for the special purpose of point clicking display screen 300 or writing on hand writing area 302.

The high level framework of the handheld data processing system 300 is similar with that shown in FIG. 2. The difference is that some components in FIG. 2 are omitted to achieve the small and handy features. In general, the handheld data processing system 300 uses a storage module instead of huge capacity outer storage devices such as disk as memory. Currently, its total memory space is less than 1M. Although the PCMCIA card can be used to extend memory space, the memory capacity after extending is still no more than several megabytes. As for IBM WorkPad, memory space is divided into ROM and RAM, located in the same storage module. ROM has the capacity of 0.5M to 1.5M, RAM has the capacity of 1M at least. The main application group is preset into ROM. Other alternate applications and system extensions can be loaded into RAM. But it is not always feasible with regard to the limitation of the capacity of RAM. Users can upgrade or improve software by changing ROM, or change the system software and application group completely by installing a single storage module. Furthermore, a typical handheld data processing system 300 usually embeds strong network communication ability, which means easy connection to the Internet or WWW.

Figure 4:
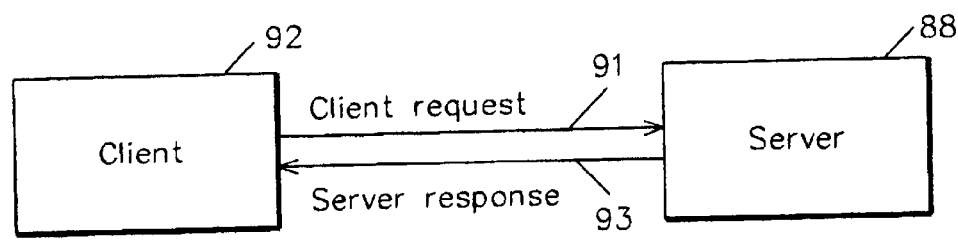
FIG. 4 shows the client/server architecture of a preferred embodiment of this invention.

FIG. 4 shows the client/server architecture of the preferred embodiment of this invention. As shown in this figure, client request (such as the request for news) 91 is sent to server 88 by client 92. Server 88 could be a remote computer system accessible via the Internet or other communication networks. Client 92 could execute on computer 20 shown in FIG. 1, or the handheld computer 300 shown in FIG. 3.

When server 88 receives the client's request, it scans and searches the original (for example, uncompressed) information (such as online news or news group), then offers the filtered electronic information as the server response 93 to the client 92.

Client 92 could be executed on a first computer while the server process could be executed on a second computer wherein they communicate to each other via communication media, thus providing the distribution ability and allowing multiple clients to access the same server at the same time.

As for WWW, the browser process executed on the client machine is in charge of establishing and maintaining connection to the server, and providing information to the user. The server machine executes the appropriate server software, which can provide information to the client in HTTP response. The HTTP response corresponds to the Web page written in HTML, or other data generated by the server.

A uniform resource locator (URL) is used to define linkage when the HTML compatible browser executes on the client machine. The client machine requests the server marked by the linkage, and receives the files in HTML format from the server.

Any browser currently available in the market, such as Netscape's Navigator, Communicator, Microsoft's IE, Mosaic developed by NCSA, Urbana-Champaign, Ill., and Lynx browser, can be used in this invention, as well as any other browser which conforms to HTTP specification.

An Internet service is generally accessed via a unique network address, the aforementioned uniform resource locator (URL), which implies the network route to the server. URL has the special syntax for defining network connection. It is basically divided into two parts, one is the protocol name and the other is the path name of the accessed object. For example, the URL "http://www.uspto.gov" (the home page of the United States Patent and Trademark Office) defines the transfer protocol "http" and the server path "www.uspto.gov". The server name corresponds to a unique IP address.

Figure 5:
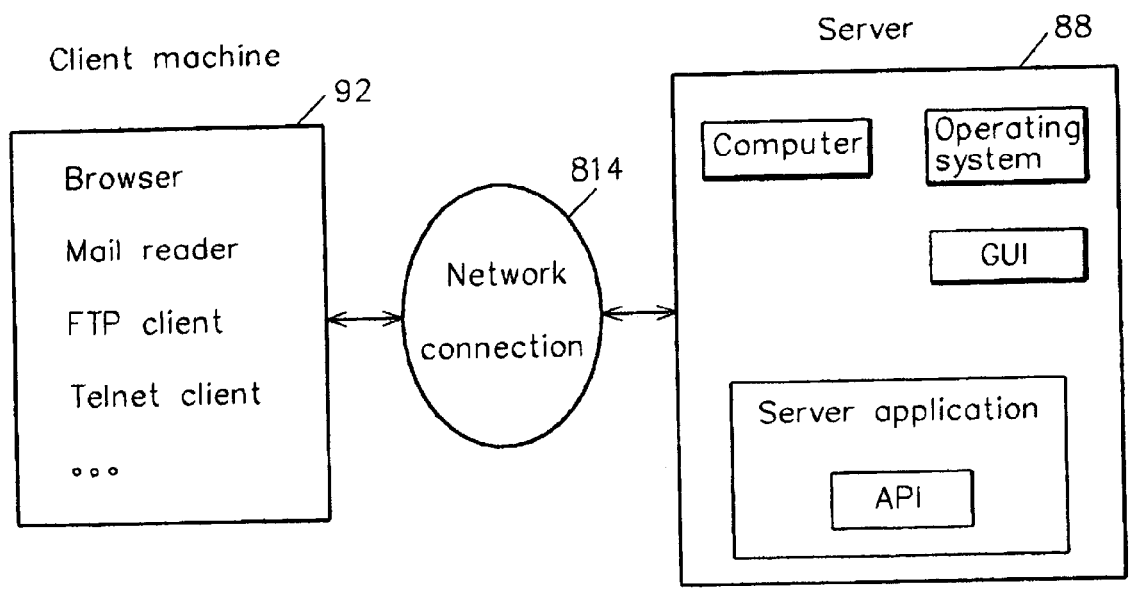
FIG. 5 shows the client/server architecture of the preferred embodiment of this invention in more detailed framework.

Now referring to FIG. 5, the client/server architecture of the preferred embodiment of this invention is shown in more detailed framework. As shown in this figure, client 92 connects to server 88 via network connection 814. Network connection 814 could be the Internet, intranet or other well-known interconnection. As for the Internet, server 88 is one of the many servers accessible to client 92. The label 92 represents a client which is a process executed on some client machine, such as a Web browser, mail reader, FTP client, Telnet client, etc.

The client machine could be the desktop, notebook, handheld computer or palm computer. For example, the client machine could be an IBM or IBM compatible computer with OS/2, IBM ThinkPad, another x86 or pentium based computer with Windows 3.1 or higher version operating system. It could also be an IBM WorkPad with PalmOS, or some kind of PDA with strong network communication ability.

A typical server includes an IBM RISC/6000 with AIX operating system and server program. In this situation, the server usually receives requests from the client via dialing, then performs the appropriate tasks such as finding the specified files or objects to fulfill the client's requests. IBM has issued lots of publications to present the different types of RISC based computers, such as "RS/6000, 7013, 7016 POWERstation and POWERserver hardware technical reference manual"(SA23-2644-00). AIX is presented in detail in the first edition of "AIX operating system technical reference manual" and other publications. Although the structure mentioned above is feasible, it is not the only one, and any other suitable hardware/operating system/server combination also can implement the present invention.

Figure 6:
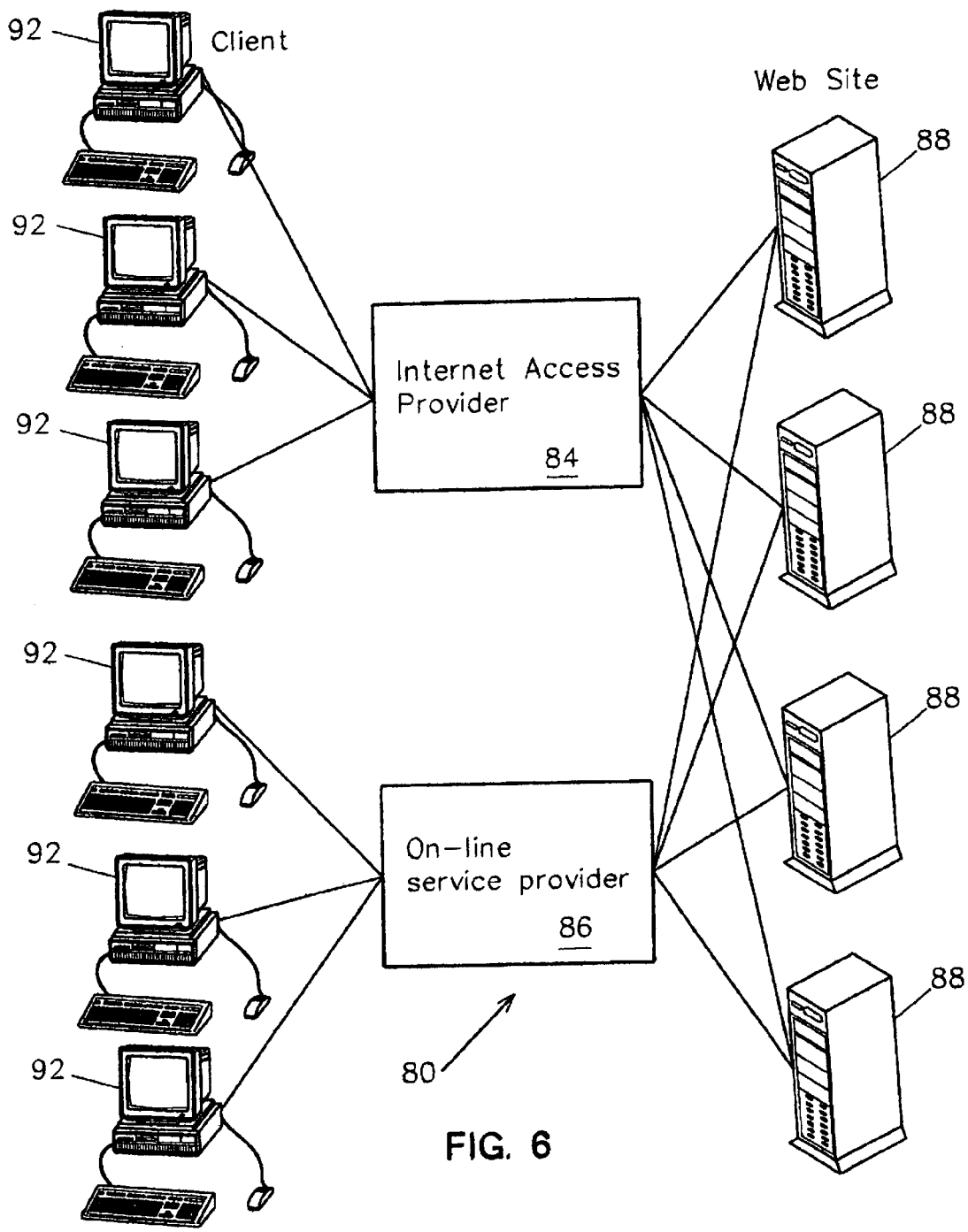
FIG. 6 shows the computer network which exemplifies the preferred embodiment of this invention.

FIG. 6 shows the computer network 80, which exemplifies the preferred embodiment of this invention. Computer network 80 could be the Internet, or any other well-known computer network with client-server architecture. Persons skilled in the art should know that the Internet is not the only distributed computer network which exemplifies the preferred embodiment of this invention. Computer network 80 could certainly be implemented by other distributed computed networks such as "intranet".

In theory, the Internet is a huge computer network which includes servers 88. The clients, usually the personal computer users, could access these servers via some special Internet access providers 84 such as Internet America or online service providers such as America On-Line, Prodigy, Compuserve etc. Each client machine can execute one or more browsers to access servers 88. Each server 88 is in charge of a so-called "web site".

It is to be noted that, while the invention involves network transmission, the details of network operations are well known and need not be repeated here.

Figure 7:
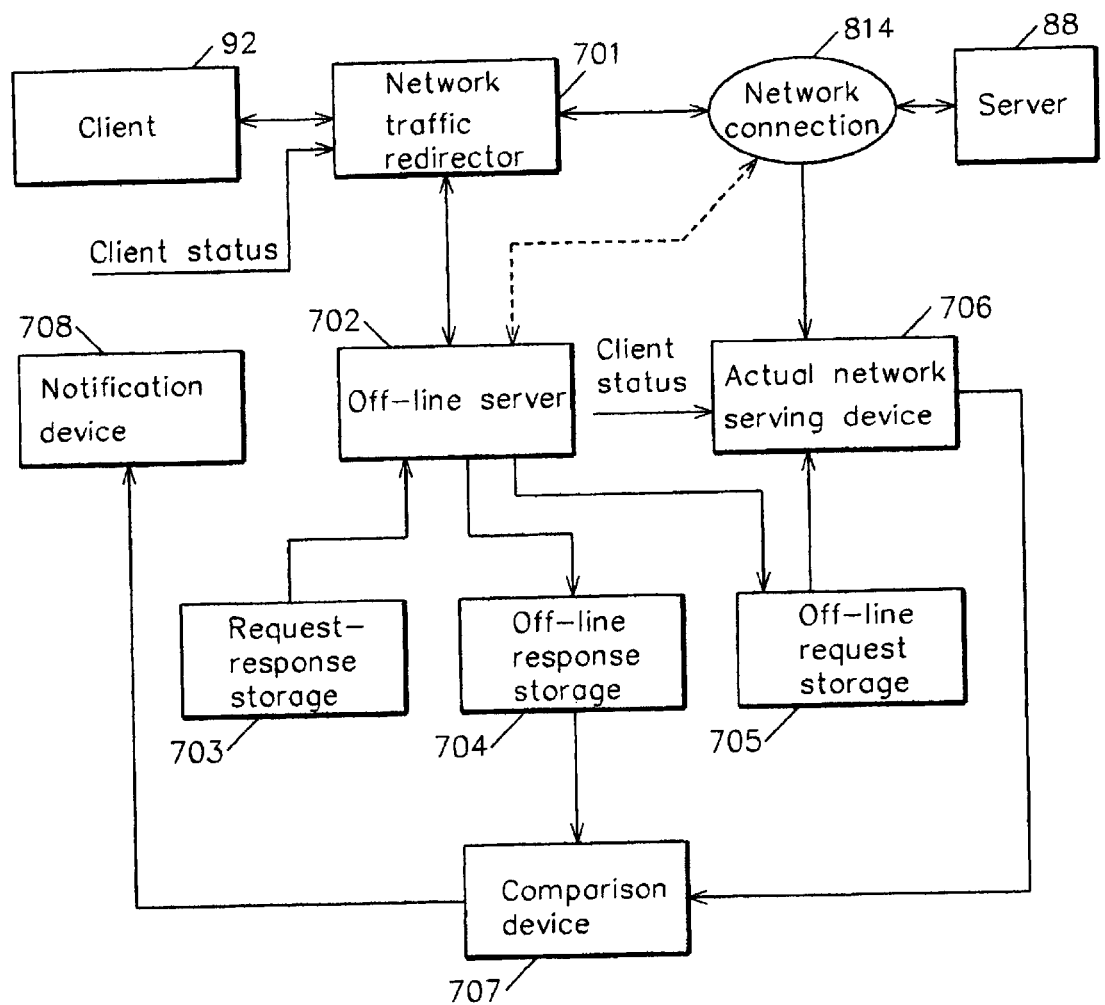
FIG. 7 shows the detailed framework of the apparatus, which offers responses to the off-line client, provided by this invention.

Referring to FIG. 7, illustration is given of the detailed inventive framework of the apparatus, which offers responses to the off-line client. Client 92 and server 88 shown in this figure are the same as that in FIG. 4 and FIG. 5. The network connection 814 is identical to the one shown in FIG. 5. The most fundamental new elements in FIG. 7 are network traffic redirector 701, off-line server 702 and request-response storage 703. They construct the basic apparatus of this invention. Network traffic redirector 701 has the following role. When client 92 is in an on-line state, for example, when it is using a browser to browse the web pages of server 88, network traffic redirector 701 makes no change to the network transmission between client 92 and server 88 at all. In other words, client 92 sends its requests to server 88 via network connection 814, and when the server 88 receives them, it performs the corresponding tasks and then returns the responses to the client 92 via network connection 814. When the client is in off-line state, i.e., when the network connection 814 is nonexistent or unable to perform adequately, the network traffic redirector 701 will redirect the requests of client 92 to off-line server 702 in the local machine, which will then respond accordingly (as further detailed below).

The above-mentioned functions of network traffic redirector 701 can be implemented by modifying the system configuration of the client machine. As mentioned above, a URL is basically divided into two parts, one being the protocol name and the other being the path name of the accessed object. For example, the URL "http://www.ibm.com" specifies the server path "www.ibm.com". The server path name corresponds to a unique IP address. Actually, all data transmission on the Internet is performed by IP address. When a client specifies a server path name, generally some conversion component is needed to do the conversion between server path name and actual IP address. Currently in the Internet, it is up to the domain name server to do this kind of conversion. So, what the network traffic redirector 701 does, when in the off-line state, is convert the server path name to the local IP address of the client machine.

Actually, the IP address conversion process can be performed by the following simple file operations. According to TCP/IP protocol, the operating system will search the "HOSTS" file in the local file system first when it gets a URL. For example, in Windows NT, the "HOSTS" file is stored under the directory "\NT\system32\drivers\etc\"; and for UNIX, this file is stored under the directory "/etc"; and for Windows 95, the file is stored under the directory "\Windows". A conversion list is contained in this file. Each conversion item occupies a single line. In each line, the IP address is placed in the first column, and the server path name is in the second.

The IP address and the host name should be separated by at least one space. The following is a sample hosts file that includes two records:

102.54.94.97 rhino.acme.com 38.25.63.10 x.acme.com

Since a domain server on the Internet can translate a host name to its IP address, the hosts file in a client machine is usually empty or doesn't exist.

In this invention, the client machine's operating system will redirect requests that are sent to the host name to itself after several records have been added in its hosts file.

For example, suppose the IP address of the client machine is 9.185.8.20. The following records are added to the hosts file on the client machine:

9.185.8.20 www.ibm.com 9.185.8.20 www.uspto.gov

Requests that are sent to www.ibm.com or www.uspto.gov from the client machine would accordingly be redirected to itself If, however, the content of the hosts file on the client machine is cleared in order to recover the system setting, requests that are sent to www.ibm.com or www.uspto.gov would be sent to their real IP address by a domain server.

When the client (92) is off-line, the network traffic redirector (701) can redirect requests to the off-line server (702) and send responses that come from the off-line server (702) to the client (92) so that the client (92) can continue to work. It looks like the client (92) were on-line.

The request-response storage (703) stores multiple requests and their corresponding responses. These request-response pairs may be defined by users or be recorded automatically by the following steps according to this invention.

When the client (92) is on-line, users set its state to record so that the network traffic redirector (701) always sends requests to the off-line server (702). Once the client (92) sends a request, the off-line server (702) can intercept the request, then the off-line server (702) sends this request to the server (88) through the network connection (814) and receives the response from the server (88) (See FIG. 7 dot line), then the off-line server (702) sends the response from the server (88) to the network traffic redirector (701). At the same time, the off-line server (702) saves the intercepted request-response pairs to the request-response storage (703) in a specific data format. The data format has no restriction on this invention. Actually one can use any data format only if the off-line server (702) can generate a response according to a requests and multiple requests and responses that are stored in the request-response storage (703). After the network traffic redirector (701) receives the response, it sends the response to the client (92). The process can be repeated until users complete recording.

The content of a request or a response is different from one network protocol to another, such as HTTP ( Hypertext Transfer Protocol), FTP (File Transfer Protocol) and Telnet, as is known to persons skilled in the art.

When the client (92) is on-line, each request from the client (92) will be sent to the server (88) by the network connection (814) and each response from the server (88) will be received by the network connection (814). As mention above, when the client (92) is off-line or on record status, each request from the client (92) will be redirected to the off-line server (702) by the network traffic redirector (701). Each response from the off-line server (702) will be sent to the network traffic redirector (701), then will be sent to the client (92).

The above description is a method that is used to create multiple requests and responses stored in the request-response storage (703), defined by users or intercepted by the off-line server (702) when users set the record status. Users can edit and modify appropriately the content of requests and responses and define default responses for some specific requests in order to simulate the real world. What is more, after the content of the request-response storage (703) is generated at a client machine, one can simply copy the content to the request-response storage of other client machines in order to avoid repeating the steps of defining, intercepting and editing.

In addition, persons skilled in the art should understand that the storage described herein can be any standalone storage or part of storage at a client machine. For example, it can be a database or file on the disk (72) or a RAM (56), both of which are shown in FIG. 2. Alternatively, it can be a storage card at a palm computer as depicted in FIG. 3.

When the client (92) is off-line, the off-line server (702) begins to work. First of all, the off-line server (702) receives requests from the client machine itself which have been redirected by the network traffic redirector (701). Next, then the off-line server generates a corresponding response to the request according to the request and the multiple requests and responses stored in the request-response storage (703).

The following is a simple process of how the off-line server (702) generates a response according to a request and multiple requests and responses at the request-response storage (703):

Assume there are multiple requests and responses in the request-response storage (703):

R1 (Request 1)

S1 (Response 1)

R2 (Request 2)

S2 (Response 2)

Rn (Request n)

Sn ( Response n)

When the off-line server receives a request R, it constructs a response according to the formula (1):

$$S=f(R, R1, R2, \ldots, Rn, S1, S2, \ldots, Sn) \quad (1)$$

as an example of (1), response S can be one of responses from S1 to Sn.

Response S can be selected from Responses (S1–Sn) according to the formula (2):

$$S=S1, \text{ if } R \text{ logically equals to } R1;$$
$$S2, \text{ if } R \text{ logically equals to } R2; \quad (2)$$
$$Sn, \text{ if } R \text{ logically equals to } Rn;$$

Logical equality might be different since the network transfer protocol is different.

With HTTP as an example, suppose the content of R1:
GET URL1
DATE 99.01.01/HTTP
and the content of R:
GET URL1
DATE 99.01.10/HTTP Obviously, the content between R1 and R is different. But the essential part is the same:

GET URL1, meaning a request for the network resource marked by URL1, therefore the response should be the same. So the off-line server (702) makes the decision that R logically equals to R1 and generates a response S that is the same as S1 at the request-response storage (703).

Note that the above example is for explanation only. Actual request data may be different from the sample above. But the difference does not limit this invention.

As a general case of formula (1), the Response S can be generated based on Request R, Request R1 to Rn and Response S1 to Sn. For a simple example, assume the content R1:

http://search.yahoo.com/bin/search?p=game and the content of R:

http://search.yahoo.com/bin/search?p=Internet

Although R1 logically equals to R, the parameters in the URL are different. Therefore, Response S1 don't become Response S. Then the content of Response S could be:

"Sorry, there is no sufficient local data. Cannot search Internet"

According to this invention, the off-line server (702) can be programmed using sophisticated algorithms to generate an appropriate response according to the received request and the multiple requests and responses stored in the request-response storage (703). These algorithms don't limit this invention.

The basic devices in this invention include the network traffic redirector (701), the off-line server (702) and the request-response storage (703). There are several devices that can be added to this invention: an off-line request storage (705) and an actual network service provider (706). All of them are on the client machine. When the client (92) is off-line, and upon the off-line server (702) receiving a client request, it generates a response according to the received request and the multiple requests and responses stored in the request-response storage (703). It stores the request sequentially in the off-line request storage (705). When the client (92) ends off-line state, the off-line request storage (705) has stored all requests from the client (92) when it was off-line. When the client (92) is on-line, the actual network service provider (706) starts to work. It fetches queued requests from the off-line request storage (705) one by one, and sends each request to the server (88) through the network connection (814). The server (88) then carries out the task required by the client (88).

To further enhance the apparatus, the invention may also include an off-line response storage (704), a comparison device (707) and a notification device (708), all of which are looted at the client machine. When the client (92) is off-line, the off-line server (702) sends a response to the network traffic redirector (701), then it stores this response to the off-line response storage (704) sequentially. Therefore, responses stored in the off-line response storage (704) correspond to requests stored in the off-line request storage (705). Of course, persons skilled in the art should understand that the off-line request storage (705) and the off-line response storage (704) can be separated into different storage or located at the same storage, as long as the correspondence relationship between requests and responses is maintained. This difference doesn't limit this invention.

When the client (92) ends its off-line session, not only does the off-line request storage (705) store all requests sent by the client (92) when it was off-line, the off-line response storage (704) also stores all responses that the off-line server (702) sent to Client 92. When the client (92) is on-line, the actual network service provider begins to work. It fetches requests from the off-line request storage (705) sequentially, then sends each request to the server (88) through the network connection (814). The server (88) actually processes the request from the client (92). Then, the client (82) receives the response from the server (88) through the network connection (814) and sends it to the comparison device (707). The comparison device (707) compares the response with the one corresponding to it which is stored in the off-line response storage (704). If there is a logical error in the comparison result, the notification device (708) will be started to report the error to users. One of the effective methods is to call client service software. The actual network service provider (706) repeats the above process until all requests stored in the off-line request storage (705) have been processed.

An example that shows how the comparison device (707) works is given below. It can compare the status code of responses. Suppose Request R1 stored in the off-line request storage (705) is sent to the server (88), then the actual network service provider (706) receives Response S:

"HTTP 1.0 302 Object Not Found"

and Response S1 which is stored in the off-line response storage (704) and corresponding to Request R1 is:

"HTTP 1.0 200 OK"

The comparison device (707) compares the status code of S with the one of S1 and finds the status code does not equal, which means that there is a logical error. In other words, Response S1 which was sent to the client (92) is wrong. So the comparison device (707) starts the notification device (708) to report this error.

There are certainly other comparison methods that can be used by the actual apparatus. But these minor differences don't limit this invention.

Figure 8:
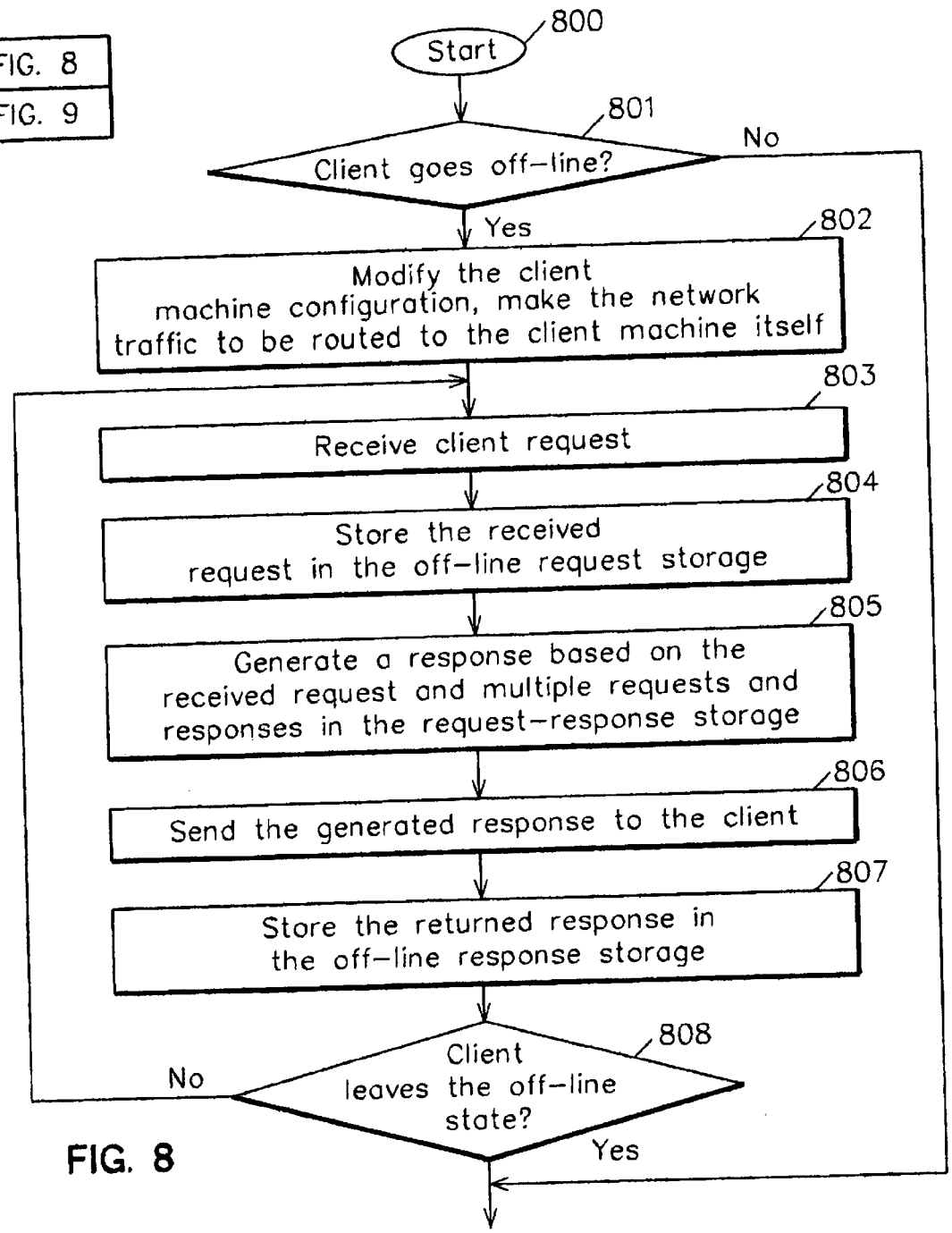
FIG. 8 shows the flowchart of the method, which is used by the off-line client, provided by this invention.

FIG. 8 shows the basic flow chart when the client is off-line. After step 800, whether the client goes off-line will be decided at step 801. If no, then it will turn to the flow chart showed in FIG. 9. If yes, it will go to step 802. The client machine configuration will be modified at step 802 in order to cause the network traffic to be routed back to the client machine itself The method to modify the client machine configuration has been shown in FIG. 7 and can modify the hosts file at the client machine.

At step 803, a request from the client will be received, then it will be stored in the off-line request storage at step 804. A response will be generated according to the received request and the multiple requests and responses stored in the request-response storage at step 805. The method to generate the response has been described above and shown in FIG. 7. Then the response from step 805 will be sent to the client at step 806 and stored in the off-line response storage at step 807. The off-line response storage is also shown in FIG. 7.

Whether the client ends the off-line operation will be decided at step 808. If the result is false, then it will turn to step 803 and continue. Otherwise it will finish or turn to the flow chart shown at FIG. 9. Note that the execute sequence can be changed. For example, step 804 can be executed after step 805 or after step 806 or after step 808. It is not necessary that step 804 be executed after step 803. Another example is that step 807 can be executed before step 806. These subtle differences do not limit this invention. In addition, If the content of the off-line response storage won't be used later, step 807 can be deleted.

In addition, as discussed above, the off-line request storage and the off-line response storage can be separated to standalone storage or located at the same storage only if it can maintain the corresponding relation between requests and responses. This difference doesn't limit this invention.

Figure 9:
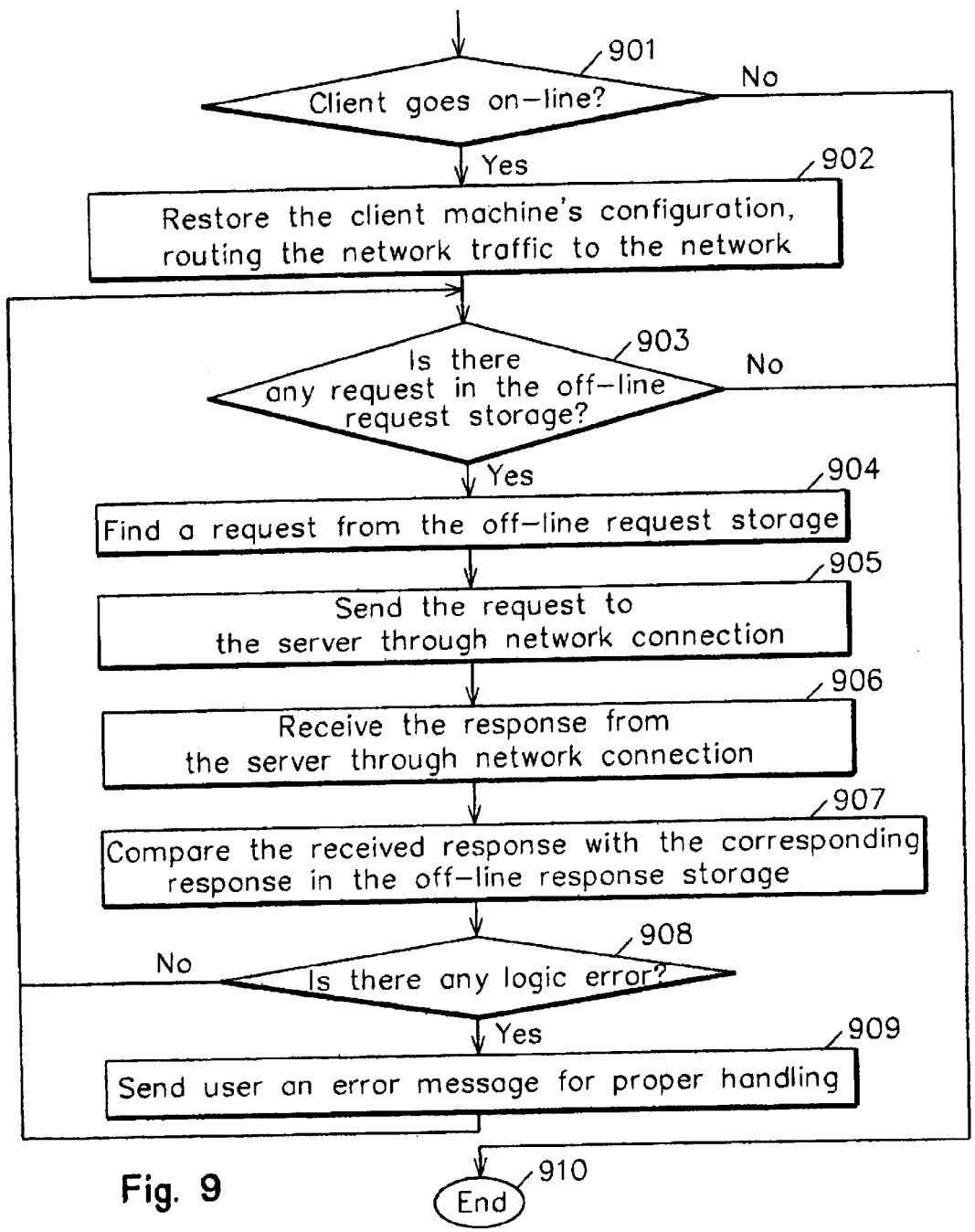
FIG. 9 shows the flowchart of the method, which is used by the client when it ends its off-line state and enters on-line state, provided by this invention.

FIG. 9 shows the flow chart when the client ends the off-line operation and goes on-line. Whether the client goes on-line will be decided at step 901. If the result is false, then it will turn to step 910 and stop. If the result is true, then it will turn to step 902. The client machine's configuration will be restored at step 902 in order to route the network traffic to the network connection instead of the client machine itself. The method to modify the client machine's configuration is the same as step 802 and will not be repeated.

Whether requests stored at the off-line request storage have been handled will be determined at step 903. If the result is false, then it will turn to step 910 and end. Otherwise it will execute step 904. A request will be fetched from the off-line storage at step 904. Then the request will be sent to the server through the network connection at step 905 and the server will process the task that the client requests. A response will be received from the server through the network connection at step 906. Then the response will be compared with the one which is corresponding to the request sent to the server (stored in the off-line response storage at step 807 shown in FIG. 8) at step 907. Whether the comparison result has a logical error will be decided at step 908. The meaning of logical error is the same as the one in the comparison device shown in FIG. 7. If the result is false, it means that the response which was sent to the client at step 806 was correct and the process will go to step 903. Otherwise, it will turn to step 909. The logical error will be reported to users appropriately. Users can change the request using a proper method that can be called a client service software, then send the changed request to the server again. After step 909, it will turn to step 903.

Figure 10:
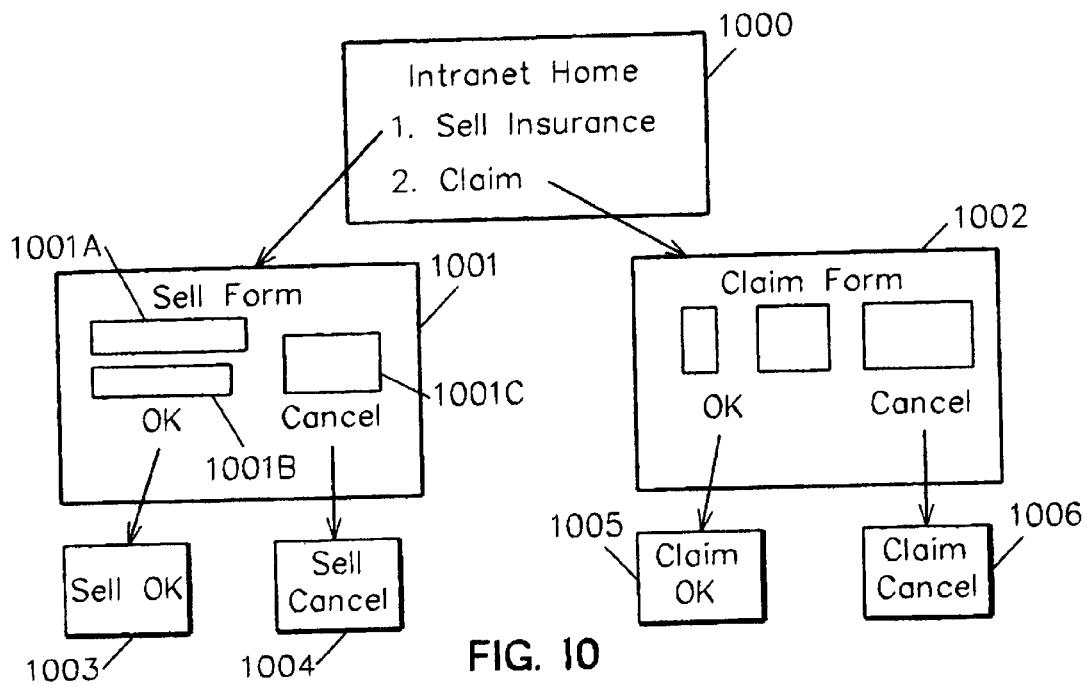
FIG. 10 gives an example to show the relationship among the internal pages of an insurance company.

FIG. 10 shows the relationship among Intranet pages at an insurance company. When a clerk of the insurance company surfs his company's Intranet site using browser (for example Netscape Communicator or Microsoft IE ), the browser sends a request "GET HTTP" to the server. The server receives the request and sends back a HTML describable home page to the browser. The browser receives this HTML file and interprets HTML tags and displays the page. The clerk will see the Intranet home page 1000 of the insurance company. There are two hot links on the page 1000:1. Sell Insurance and 2. Claim.

When the clerk clicks the first hot link (1. Sell Insurance ), the browser will get the URL of the first hot link and generate another request and send it to the server. The server will receive this request and generate a response according to the URL at the request and send it back to the browser. Then the browser will receive this response and display information. The clerk will see the "Selling Form" page 1001. There are three empty fields 1001A, 1001B and 1001C on the form 1001. When the clerk sells insurance, he will fill these three empty fields according to a customer information. Persons skilled in the art know that data filled at these three empty fields will become parameters stored at a URL. These three empty fields are an example. The number of empty fields relates to a customer information required by the insurance sales business and is not meant, in any way, to limit the invention.

There are two hot links in the page 1001: "OK" and "Cancel". If the clerk clicks the "OK", the browser will send a request which includes the above three parameters to the server. If the server handles this request correctly, it will send back another HTTP response and the browser will display the "Sell OK" page 1003 correspondingly. If the clerk clicks "Cancel", the browser will display the "Sell Cancel" page 1004.

Similarly, when the clerk clicks the second hot link (2. Claim) in the page 1000, the browser will display the "Claim Form" page 1002 from the server. There are three parameters in this page. When the clerk clicks "OK" in the page 1002, the browser will send a URL request which includes three parameters to the server. If the server handles this request correctly, it will send back the "Claim OK" page 1005. If the clerk clicks the "Cancel" in the page 1002, the browser will display the "Claim Cancel" page 1006.

Since the protocol in this example is HTTP, requests and response between the browser and the server conform to the HTTP format.

Assume a clerk of the insurance company wants to visit three customers to sell insurance to two of the customers and process a claim for one of the customers. There are several ways to process this business. The first one is that the clerk invites these three customers to his company and surfs his company's Intranet site and fills the above forms 1001 and 1002 to process the business using the browser. Obviously, it is unrealistic to invite customers to the company. The second one is that the clerk visits the above three customers outside taking a notepad computer or a palm computer which has installed a browser. When he visits each customer, he connects his notepad computer or a palm computer to his company's server by dial-up networking and gets the corresponding forms and fills them and asks the server to process the insurance or claim business. Since there is no guarantee of obtaining a network connection anywhere, the second method has shortcomings considering the low Internet transport speed and the security of network transport.

Inconvenience can be overcome using this invention. For example, before the clerk goes out to visit the above three customers, he connects his notepad computer or his palm computer to the company's server and sets the status to record. Then he surfs his company's Intranet site to go through the home page 1000, Sell Form 1001, Sell OK 1003, Sell Cancel 1004, Claim Form 1002, Claim OK 1005 and Claim Cancel 1006. After he ends surfing, the request-response storage installed at his notepad computer or his palm computer has stored all kinds of requests that need to be sent to the company's server when he goes out and has stored the corresponding responses.

Of course, alternatively, data stored at the request-response storage can be preset and edited by computer professionals of the insurance company. Before each clerk goes out to do business, the preset data will be copied to the request-response storage at his notepad computer or the proper storage card will be installed to his palm computer. When the clerk goes out with the stored information, he doesn't need to connect to the company server, and he is able to work off-line as if he is connected on-line.

Figure 11:
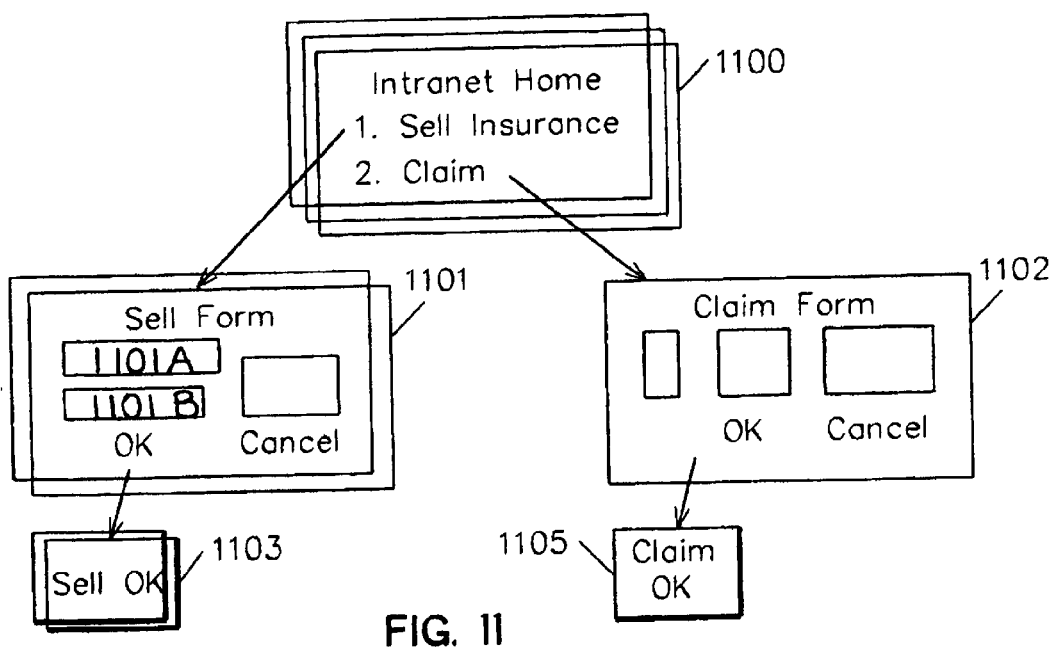
FIG. 11 gives an example to show that a browser could get appropriate responses when off-line.

FIG. 11 shows how a browser gets responses when it is off-line.

For example, when the clerk visits the first customer, he starts a browser to send a request. According to the method or the apparatus of this invention that can generate a response according to the request sent by the browser and multiple requests and responses stored in the request-response storage, the browser gets the response and displays the home page 1100. Since the clerk sells insurance to the first customer, he clicks "1. Selling insurance". The browser gets a response, according to the request sent by the browser and multiple requests and responses stored in the request-response storage, and displays the Sell Form 1101. The clerk fills the first customer's data to these empty fields 1101A, 1101B and 1101C and clicks "OK". The browser gets the corresponding response and displays the Selling OK 1103. Finally, the clerk closes the browser. In this process, the off-line request storage and the off-line response storage installed at the clerk's notepad computer have stored multiple requests and responses.

Similarly, after the clerk visits the second customer, the off-line request storage and the off-line response storage will have additionally stored another set of multiple requests and responses.

When the clerk visits the third customer, he starts a browser. The browser displays the home page 1100. Since he wants to process claim, he clicks "2. Claim". The browser gets a response, based on the request sent by the browser and multiple requests and responses stored in the request-response storage, and displays the Claim Form 1102. The clerk fills the customer's data and clicks "OK". The browser gets the corresponding response and displays the "Claim OK" 1105. At last, the clerk closes the browser. In this process, the off-line request storage and the off-line response storage installed at the clerk's notepad computer have again recorded the multiple requests and responses associated with the off-line customer interaction.

Therefore, the browser looks like an on-line session in the above process not only to the clerk but also to customers according to the method or the apparatus of this invention.

When the clerk comes back to his office, he connect his notepad computer to the server within the Intranet. Multiple requests stored in the off-line request storage can be automatically sent to the server according to the method or the apparatus of this invention. The server handles the real tasks: two selling insurance and one claiming. Of course, there may be logical errors that need to be reported to users in this process as mentioned above. For example, when selling insurance, the customer filled his age to 90 and the browser displayed the page "Selling OK". According to the policy of the insurance company, there is no insurance for a person whose age is 90 or over 90. Therefore, when the server handles this task, it sends the response "Sorry, the age can not be over 90.". So the logical error occurs. For example, the clerk is notified the logical error by the text "A customer's age can not be over 90" displayed in the browser window, then the clerk will verify this information to the customer or modify the customer's wrong data and send the request again.

In addition, the method in this invention can be implemented to a computer application and stored in readable storage media in a computer. The application can be installed to mobile devices such as client software in a practical appliance. The client software doesn't need to be modified and can work off-line. The storage media can have versatile formats, for example magnetic format or optical format. Versatile formats don't limit this invention.

While the preferred embodiments of the present invention have been described in detail with reference to the drawings, various modifications, additions and changes can be made by persons skilled in the art, without departing from the scope and the spirit of this invention as set forth in the appended claims.

What is claimed is:

1. An apparatus for providing responses for requests of an off-line client, comprising:

a request-response storage component, provided in a client machine, which stores a plurality of requests and a plurality of responses;

a network traffic redirector, for redirecting requests of the client from a network connection to the client machine itself by modifying system configuration of the client machine when said client is in an off-line state, and for redirecting requests of the client from the client machine itself to the network connection by resuming the system configuration of the client machine when said client leaves the off-line state and enters an on-line state; and an off-line server, provided in the client machine, for receiving the requests of the client redirected by said network traffic redirector to the client machine itself, and for generating responses based on requests received and on said plurality of requests and said plurality of responses stored in said request-response storage component, and returning generated responses to said client as responses of a server, wherein said plurality of requests and said plurality of responses stored in said request-response storage are a plurality of requests and a plurality of responses which have been pre-defined by a user.

2. The apparatus according to any claim 1, wherein said off-line server comprises an off-line request storage, for storing each request of the client received by said off-line server; and said apparatus further comprises:

an actual network service means, provided in said client machine, for sending each request stored in said off-line request storage to the server through a network connection after said client leaves the off-line state and enters an on-line state.

3. The apparatus according to claim 2, wherein said off-line server further comprises an off-line response storage, for storing the responses returned to said client in an association manner with the requests stored in said off-line request storage; and wherein said actual network service means, after sending each request to said server, further receives each response returned from said server;

said apparatus further comprises:

a comparison means for comparing said response received by said actual network service means from said server with a response stored in said off-line response storage in an association manner with the request sent to said server; and a notification component for, when the comparison result of said comparison means indicates a logic error, notifying the user of said error.

4. An apparatus for providing responses for requests of an off-line client, comprising:

a request-response storage component, provided in a client machine, which stores a plurality of requests and a plurality of responses;

a network traffic redirector, for redirecting requests of the client from a network connection to the client machine itself by modifying system configuration of the client machine when said client is in an off-line state, and for redirecting requests of the client from the client machine itself to the network connection by resuming the system configuration of the client machine when said client leaves the off-line state and enters an on-line state; and an off-line server, provided in the client machine, for receiving the requests of the client redirected by said network traffic redirector to the client machine itself, and for generating responses based on requests received and on said plurality of requests and said plurality of responses stored in said request-response storage component, and returning generated responses to said client as responses of a server, wherein said plurality of requests and said plurality of responses stored in said request-response storage component are a plurality of requests of the client and a plurality of responses of the server which have been intercepted in the client machine while said client is in an on-line state.

5. The apparatus according to any claim 4, wherein said off-line server comprises an off-line request storage, for storing each request of the client received by said off-line server; and said apparatus further comprises:
an actual network service means, provided in said client machine, for sending each request stored in said off-line request storage to the server through a network connection after said client leaves the off-line state and enters an on-line state.

6. The apparatus according to claim 5, wherein said off-line server further comprises an off-line response storage, for storing the responses returned to said client in an association manner with the requests stored in said off-line request storage; and wherein said actual network service means, after sending each request to said server, further receives each response returned from said server;

said apparatus further comprises:
a comparison means for comparing said response received by said actual network service means from said server with a response stored in said off-line response storage in an association manner with the request sent to said server; and
a notification component for, when the comparison result of said comparison means indicates a logic error, notifying the user of said error.

7. A method for providing responses for requests of an off-line client, comprising the steps of:
(a) providing a request-response storage in a client machine, for storing a plurality of requests and a plurality of responses;
(b) redirecting requests of the client from a network connection to the client machine itself by modifying system configuration of the client machine when said client enters an off-line state; and
(c) while said client is in the off-line state, repeatedly performing in the client machine steps of:
(c1) receiving a request redirected to the client machine itself,
(c2) generating a response based on said request, said plurality of requests and said plurality of responses stored in said request-response storage, and
(c3) returning said response to said client as a response of a server, and wherein the plurality of requests and the plurality of responses in said step (a) are pre-defined by a user.

8. The method according to claim 7, wherein for said step (c1) the request received is further recorded in an off-line request storage provided in the client machine, and said method further comprises steps of:
(d) redirecting requests of the client from the client machine itself to a network connection by resuming the system configuration of the client machine when said client leaves the off-line state and enters an on-line state; and (e) repeatedly performing following steps in the client machine:
(e1) retrieving a request from said off-line request storage; and
(e2) sending said request to a server through a network connection.

9. The method according to claim 8, characterized in that in step (c3) the response returned to said client is further recorded in an off-line response storage provided in the client machine in an association manner with the requests recorded in step (c1), and said step (e) further comprises steps of:
(e3) receiving a response returned by said server;
(e4) retrieving from said off-line response storage a response associated with said request retrieved in step (e1);
(e5) comparing the response received in step (e3) with the response retrieved in step (e4); and
(e6) notifying the user of an error if comparison result indicates a logical error.

10. A method for providing responses for requests of an off-line client, comprising the steps of:
(a) providing a request-response storage in a client machine, for storing a plurality of requests and a plurality of responses;
(b) redirecting requests of the client from a network connection to the client machine itself by modifying system configuration of the client machine when said client enters an off-line state; and
(c) while said client is in the off-line state, repeatedly performing in the client machine steps of:
(c1) receiving a request redirected to the client machine itself,
(c2) generating a response based on said request, said plurality of requests and said plurality of responses stored in said request-response storage, and
(c3) returning said response to said client as a response of a server, and wherein said plurality of requests and said plurality of responses in said step (a) are obtained by repeatedly performing, while said client is in an on-line state, the steps of:
intercepting a request sent by said client to a server;
sending said request to said server through a network connection;
receiving a response returned by said server;
returning said response to said client; and
storing said request and said response into said request-response storage.

11. The method according to claim 10, wherein for said step (c1) the request received is further recorded in an off-line request storage provided in the client machine, and said method further comprises steps of:
(d) redirecting requests of the client from the client machine itself to a network connection by resuming the system configuration of the client machine when said client leaves the off-line state and enters an on-line state; and (e) repeatedly performing following steps in the client machine:
(e1) retrieving a request from said off-line request storage; and
(e2) sending said request to a server through a network connection.

12. The method according to claim 11, characterized in that in step (c3) the response returned to said client is further recorded in an off-line response storage provided in the client machine in an association manner with the requests recorded in step (c1), and said step (e) further comprises steps of:
(e3) receiving a response returned by said server;
(e4) retrieving from said off-line response storage a response associated with said request retrieved in step (e1)
(e5) comparing the response received in step (e3) with the response retrieved in step (e4); and
(e6) notifying the user of an error if comparison result indicates a logical error.

13. A computer-readable media for recording programs, on which a program is recorded for performing steps of:
when it is determined that a client enters an off-line state, modifying system configuration of the client machine, such that requests of the client are redirected from a network connection to the client machine itself; and
while said client is in the off-line state, repeatedly performing following steps in the client machine:
receiving a request redirected to the client machine itself,
generating a response based on said request, said plurality of requests and said plurality of responses stored in a request-response storage provided in the client machine, and
returning said response to said client as a response of a server, characterized in that said plurality of requests and said plurality of responses stored in said request-response storage are pre-defined by a user.

14. The computer-readable media for recording programs according to claim 13, wherein the step (c1) the request received is further recorded in an off-line request storage provided in the client machine, and the program stored in said computer-readable media further performs steps of:
(d) redirecting requests of the client from the client machine itself to a network connection by resuming the system configuration of the client machine when said client leaves the off-line state and enters an on-line state; and
(e) repeatedly performing following steps in the client machine:
(e1) retrieving a request from said off-line request storage; and
(e2) sending said request to a server through a network connection.

15. The computer-readable media for recording programs according to claim 14, characterized in that in step (c3) the response returned to said client is further recorded in an off-line response storage provided in the client machine in an association manner with the requests recorded in step (c1), and said step (e) further comprises steps of:
(e3) receiving a response returned by said server;
(e4) retrieving from said off-line response storage a response which is associated with said request retrieved in step (e1);
(e5) comparing the response received in step (e3) with the response retrieved in step (e4); and
(e6) notifying the user of an error if comparison result indicates a logical error.

16. A computer-readable media for recording programs, on which a program is recorded for performing steps of:
when it is determined that a client enters an off-line state, modifying system configuration of the client machine, such that requests of the client are redirected from a network connection to the client machine itself; and
while said client is in the off-line state, repeatedly performing following steps in the client machine:
receiving a request redirected to the client machine itself,
generating a response based on said request, said plurality of requests and said plurality of responses stored in a request-response storage provided in the client machine, and
returning said response to said client as a response of a server, characterized in that said plurality of requests and said plurality of responses stored in said request-response storage are obtained by repeatedly performing following steps while said client is in an on-line state:
intercepting a request sent by said client to a server;
sending said request to said server through a network connection;
receiving a response returned by said server;
returning said response to said client; and
storing said request and said response into said request-response storage.

17. The computer-readable media for recording programs according to claim 16, wherein the step (c1) the request received is further recorded in an off-line request storage provided in the client machine, and the program stored in said computer-readable media further performs steps of:
(d) redirecting requests of the client from the client machine itself to a network connection by resuming the system configuration of the client machine when said client leaves the off-line state and enters an on-line state; and
(e) repeatedly performing following steps in the client machine:
(e1) retrieving a request from said off-line request storage; and
(e2) sending said request to a server through a network connection.

18. The computer-readable media for recording programs according to claim 17, characterized in that in step (c3) the response returned to said client is further recorded in an off-line response storage provided in the client machine in an association manner with the requests recorded in step (c1), and said step (e) further comprises steps of:
(e3) receiving a response returned by said server;
(e4) retrieving from said off-line response storage a response which is associated with said request retrieved in step (e1);
(e5) comparing the response received in step (e3) with the response retrieved in step (e4); and
(e6) notifying the user of an error if comparison result indicates a logical error.

* * * * *